US012243124B2

(12) United States Patent
Ghosh et al.

(10) Patent No.: US 12,243,124 B2
(45) Date of Patent: Mar. 4, 2025

(54) PERSONALIZED MACHINE LEARNING SYSTEM TO EDIT IMAGES BASED ON A PROVIDED STYLE (71) Applicant: Apple Inc., Cupertino, CA (US)

(72) Inventors: Shaona Ghosh, Campbell, CA (US); Milind Lingineni, Irvine, CA (US); Come H. Weber, Paris (FR)

(73) Assignee: Apple Inc., Cupertino, CA (US)

( * ) Notice: Subject to any disclaimer, the term of this patent is extended or adjusted under 35 U.S.C. 154(b) by 567 days.

(21) Appl. No.: 17/648,084

(22) Filed: Jan. 14, 2022

(65) Prior Publication Data

US 2022/0222872 A1 Jul. 14, 2022

Related U.S. Application Data (60) Provisional application No. 63/137,393, filed on Jan. 14, 2021.

(51) Int. Cl.
*G06T 11/00* (2006.01)
*G06N 3/045* (2023.01)
*G06T 11/40* (2006.01)

(52) U.S. Cl.
CPC ............ *G06T 11/001* (2013.01); *G06N 3/045* (2023.01); *G06T 11/40* (2013.01)

(58) Field of Classification Search
CPC ....... G06T 11/001; G06T 11/40; G06N 3/045; G06N 3/047; G06N 3/08
See application file for complete search history.

(56) References Cited

U.S. PATENT DOCUMENTS 10,665,011 B1 5/2020 Sunkavalli
2019/0244060 A1* 8/2019 Dundar .................. G06T 15/00
(Continued)

FOREIGN PATENT DOCUMENTS

DE 102020102549 A1 * 8/2020

OTHER PUBLICATIONS

Chen et al. "StyleBank: An Explicit Representation for Neural Image Style Transfer." IEEE Conference on Computer vision and Pattern Recognition (CVPR), Jul. 21, 2017, pp. 2770-2779 (Year: 2017).*
(Continued)

*Primary Examiner* — Jon Chang
(74) *Attorney, Agent, or Firm* — Blank Rome LLP (57) ABSTRACT Machine learning (ML) models are introduced for image stylization, which learn and apply multiple selectable image styles, including styles learned in an ad hoc fashion. According to some embodiments, such models may be trained on images or image pairs comprising images stylized into one or more of a plurality of predetermined styles. At inference time, a style vector representative of a particular selected style may be obtained and injected into the neural network at one or more locations to stylize an input image into the selected style. According to other embodiments, the neural network may be trained in an ad hoc fashion to learn new styles based on small sets of input images. Adversarial training (e.g., in the form of a discriminator network and/or conditional generative adversarial network (C-GAN) loss) may optionally be incorporated into the training to reduce artifacts and generate images that more closely match the selected style.

20 Claims, 6 Drawing Sheets (56) References Cited

U.S. PATENT DOCUMENTS

| | | |
|---|---|---|
| 2020/0160593 A1 | 5/2020 | Gu |
| 2021/0264576 A1 | 8/2021 | Sun |
| 2022/0157012 A1 | 5/2022 | Ghosh |
| 2022/0157014 A1 | 5/2022 | Sevastopolskiy |
| 2022/0335636 A1 | 10/2022 | Bi |

OTHER PUBLICATIONS

Sengupta, et al., "SfSNet: Learning Shape, Reflectance and Illuminance of Faces in the Wild," Conference on Computer Vision and Pattern Recognition (CVPR) 2018.

Sun, et al., "Single Image Portrait Relighting," arXiv:1905.00824v1 May 2, 2019.

Yu, et al., "InverseRenderNet: Learning single image inverse rendering," Conference on Computer Vision and Pattern Recognition (CVPR) 2019.

Zhou, et al., "Deep Single-Image Portrait Relighting," International Conference on Computer Vision (ICCV) 2019.

\* cited by examiner

PERSONALIZED MACHINE LEARNING SYSTEM TO EDIT IMAGES BASED ON A PROVIDED STYLE

TECHNICAL FIELD

This disclosure relates generally to the field of digital image processing. More particularly, but not by way of limitation, it relates to techniques for training a single neural network to modify input images to produce output images of multiple, different selectable artistic and/or photographic styles.

BACKGROUND

The advent of portable integrated computing devices has caused a wide proliferation of cameras and video devices. These integrated computing devices commonly take the form of smartphones or tablets and typically include general purpose computers, cameras, sophisticated user interfaces including touch sensitive screens, and wireless communications abilities through Wi-Fi, Long Term Evolution (LTE), 5G New Radio (NR), High Speed Downlink Packet Access (HSDPA) and other cell-based or wireless technologies (Wi-Fi is a trademark of the Wi-Fi Alliance, LTE is a trademark of the European Telecommunications Standards Institute (ETSI)).

The wide proliferation of these integrated devices provides opportunities to use the devices' capabilities to perform tasks that would otherwise require dedicated hardware and software. For example, as noted above, integrated devices such as smartphones and tablets typically have two or more embedded cameras. These cameras generally amount to lens/camera hardware modules that may be controlled through the general purpose computer using firmware and/or software (e.g., "Apps") and a user interface, e.g., including a touch-screen interface and/or touchless control, such as voice control.

The integration of cameras into communication devices, such as smartphones and tablets, has enabled people to share images and videos in ways never before possible. It is now very popular to acquire and immediately share images and/or videos with other people by either sending the photos via text message, by SMS, by email, though Apps, or by uploading the photos to an Internet-based website, such as a social networking site or a photo sharing site.

Users often desire to apply one or more corrective or artistic filters to their images and/or videos before sharing them with other users or posting them to Internet-based websites. Some such filters may modify the images in a content-independent fashion, e.g., a vignetting effect that darkens the outer borders of the image. Other filters may perform one or more color or brightness mapping techniques to improve the appearance of the image. Still other filters may manipulate each pixel in a programmatically-defined fashion to create a particular "effect," e.g., an antique image effect or a black and white effect.

However, more and more, users desire the ability to apply more complex photographic and/or artistic style effects to their captured images and/or video that do not simply perform a mathematical mapping of each pixel value in the image to generate an output image, but instead use artificial intelligence to imbue the 'essence' of a particular photographic and/or artistic style to their captured images and/or video. Some such approaches for applying photographic and/or artistic style effects styles to images have proposed the utilization of neural networks that learn how to separate and recombine the content and style of arbitrary input images to synthesize output images having a particular photographic and/or artistic style. However, such networks have heretofore taken significant amounts of time and processing power to apply just a single type of style to an input image.

Due to the substantial time and processing requirements—and relative inflexibility—of prior art Machine Learning (ML)-based image style transfer algorithms, the generation of stylized images or stylized video sequences in multiple different styles (and/or newly-learned styles) via a single neural network has not been feasible. Thus, it may be beneficial to provide devices, methods, and non-transitory program storage devices (NPSDs) that enable an image rendering pipeline to be capable of stylizing input images into one or more of a plurality of user-selectable predetermined styles—as well as learn new styles in an ad hoc fashion on small sets of input images.

SUMMARY

To attempt to overcome some of the aforementioned problems and limitations associated with prior art ML-based image style transfer networks, a framework for creating and using a single neural network trained on multiple styles is disclosed herein. In order to improve upon the inflexibility of prior art neural image stylization algorithms, it may be desirable to allow a user to inject a notion of a selected style into the model at a particular location during inference time. In such cases, the user could indicate what particular style he or she wants to stylize an input image with, e.g., via the selection of a fixed or learned style vector representative of the particular style from an embedding matrix, and the selected style vector may then serve as an additional input parameter to the neural network, i.e., along with the input image that is to be stylized. In this manner, the network could be trained on an arbitrary number of styles, each with its own n-parameter style vector stored in the embedding matrix, which could be selectively applied to an input image, as desired by a user.

Thus, according to some embodiments described herein, novel ML models are introduced for image stylization, i.e., the task of learning image transformation operations that can edit an image to render the image with particular artistic and/or stylization effects, including in the learning of new image styles in an ad hoc fashion. According to some such embodiments, ML models may be trained on images comprising input images stylized into one or more of a plurality of predetermined styles (e.g., a high contrast style, a low contrast style, an "inky" black and white photograph style, a van Gogh painting style, etc.). At inference time, a style vector representative of a particular selected style may be obtained and injected into the neural network at one or more locations (e.g., at the end of the network's downsampling layers, after one or more individual downsampling layers, after each downsampling layer, etc.) and used to stylize an input image into the selected style. If desired, one or more semantic masks may also be determined and applied over a given input image, e.g., to limit the application of the selected style to only certain identified semantic regions within the input image (e.g., stylizing just the sky, just water, just human faces, etc., within the input image with the selected style).

According to other embodiments, the neural network may also be trained in an ad hoc fashion to learn new styles based on small sets of input images, e.g., fewer than 100 images of a particular style. Adversarial training (e.g., in the form of a discriminator network and/or conditional generative adversarial network (GAN) loss term) may also optionally be incorporated into the training process to reduce unwanted artifacts and generate images that more closely match the selected style.

According to some embodiments, there is provided a method of stylizing input images into a plurality of styles, comprising: obtaining a neural network configured to stylize images into a plurality of styles, wherein the neural network is trained on images comprising images stylized into one of the plurality of styles; obtaining an input image; obtaining a selection of a first style of the plurality of styles; obtaining a style vector representative of the first style; injecting the style vector into the neural network at one or more locations (e.g., a first location and/or one or more second locations); and using the neural network with the injected style vector to stylize at least a portion of the input image into a stylized output image, based on the selected first style.

According to some such embodiments, the first style may comprise corrective image enhancements and/or local image modifications, global image-level modifications, or a combination of local image modifications and global image-level modifications. According to other such embodiments, the style vector representative of the first style may be obtained from an embedding matrix. According to still other such embodiments, the first location where the style vector is injected into the neural network may comprise one of: a bottleneck layer of the neural network; a downsampling layer of the neural network; or an upsampling layer of the neural network. In some such embodiments, the style vector may be injected into the neural network in the form of an additional feature channel, e.g., via concatenation with an existing feature map at the first location in the neural network. In other such embodiments, a user may also be able to specify a desired strength for the application of the first style (e.g., a strength anywhere between 0% application of the first style and full, or 100%, application of the first style) on either a per-image, per-group of images, or global basis.

In other embodiments, there is provided a method of training a ML model to stylize input images into a plurality of styles, comprising: obtaining a training set comprising a first plurality of images, wherein the first plurality of images comprises a second plurality of image pairs, wherein each image pair comprises a first image and a version of the first image stylized into one of a plurality of styles; initializing a neural network configured to learn the plurality of styles from the first plurality of images, wherein the neural network comprises a style embedding matrix having an entry for each style of the plurality of styles; and for each image pair in the second plurality of image pairs: determining a style of the stylized version of the first image from the current image pair; decomposing the first image from the current image pair into a first plurality of features using the neural network; reconstructing the first image from the current image pair using a style vector representative of the determined style to attempt to match the stylized version of the first image from the current image pair; and refining the neural network based, at least in part, on one or more loss functions computed between the reconstructed first image from the current image pair and the stylized version of the first image from the current image pair, wherein refining the neural network further comprises updating the style embedding matrix entry for the determined style of the first image from the current image pair.

According to some such embodiments, at least one of the one or more loss functions computed between each reconstructed first image and the stylized version of each first image may comprise an adversarial loss term for the reconstructed first image. According to other such embodiments, the method may further comprise, for each image pair in the second plurality of image pairs: performing an instance normalization operation (e.g., a conditional instance normalization (CIN) operation) on the first image from the current image pair. According to still other such embodiments, the method may further comprise: obtaining a third plurality of images, wherein the third plurality of images comprise images stylized in an ad hoc style that is not among the plurality of styles; and for each image in the third plurality of images: performing a conditional instance normalization (CIN) operation on the current image from the third plurality of images; and refining the neural network based, at least in part, on one or more parameters learned from the current image of the third plurality of images to learn the ad hoc style. In some cases, at least a portion of the parameters (e.g., gradient values) learned relating to the ad hoc style may then be transmitted via a network to a server. Such a system can allow for the ad hoc personalized styles, e.g., as learned locally on a user's device, to be aggregated on the server and used in the construction of a better global style model that may later be dispatched to other user devices. In this way, over time, the global model may learn various personalized user styles.

According to still other such embodiments, each image pair may further comprise a version of the first image stylized into each of the plurality of styles, and, for each image pair in the second plurality of image pairs, the method further comprises: determining a style of each of the stylized versions of the first image from the current image pair; decomposing the first image from the current image pair into a first plurality of features using the neural network; reconstructing the first image from the current image pair a plurality of times, using a style vector representative of the corresponding determined style each time, to attempt to match each of the stylized versions of the first image from the current image pair; and refining the neural network based, at least in part, on one or more loss functions computed between each of the reconstructed versions of the first image from the current image pair and the corresponding stylized version of the first image from the current image pair, wherein refining the neural network further comprises updating the corresponding style embedding matrix entry for the style of the respective stylized version of the first image from the current image pair.

Various NPSD embodiments are also disclosed herein. Such NPSDs are readable by one or more processors. Instructions may be stored on the NPSDs for causing the one or more processors to perform any of the digital image processing techniques disclosed herein.

Various programmable electronic devices are also disclosed herein, in accordance with the NPSD and method embodiments enumerated above. Such electronic devices may include one or more image capture devices, such as optical image sensors/camera units; a display; a user interface; one or more processors; and/or a memory coupled to the one or more processors. Instructions may be stored in the memory, the instructions causing the one or more processors to execute instructions in accordance with the various techniques disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Exemplary Deep Neural Network Architectures

Figure 1:
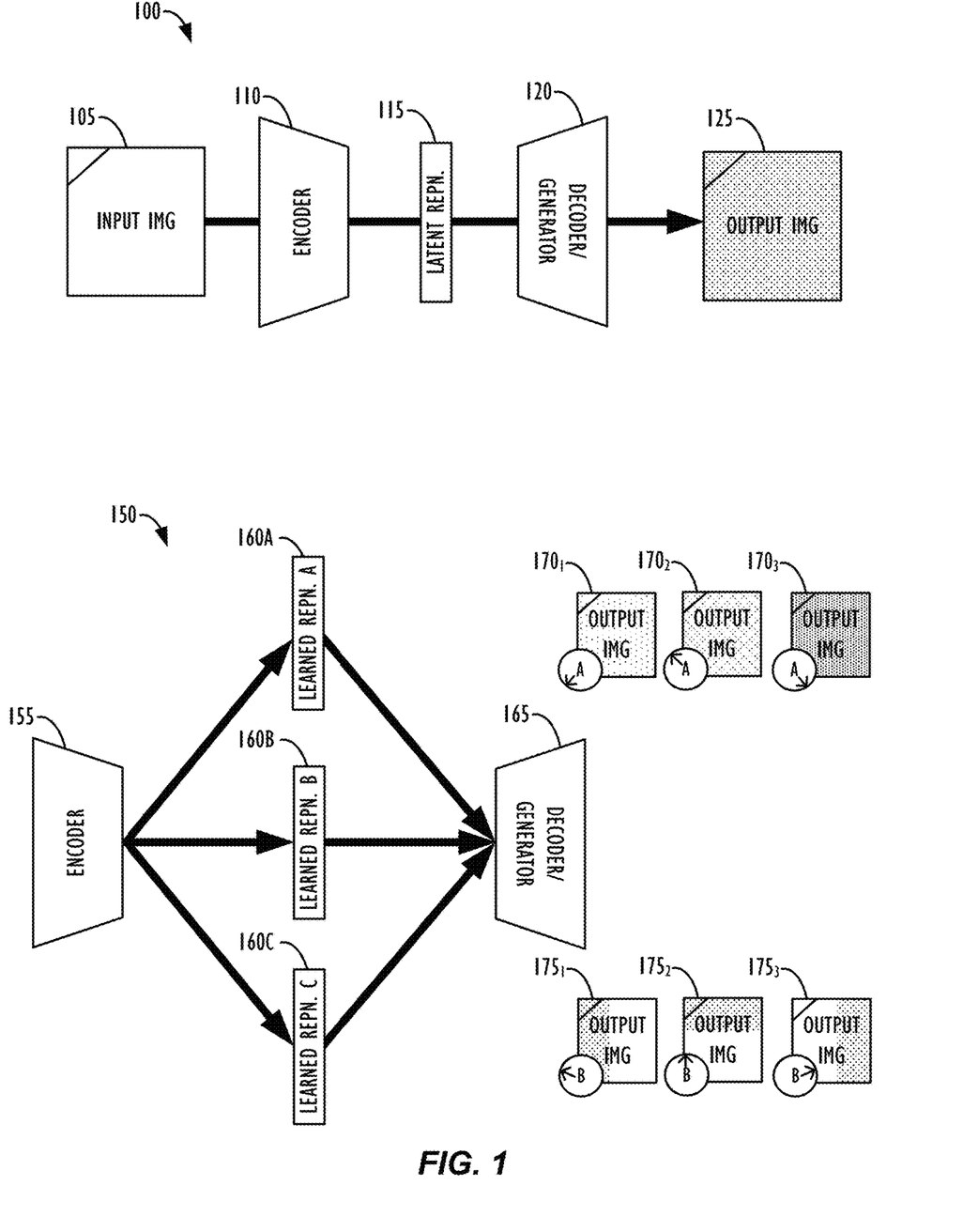
FIG. 1 illustrates exemplary neural network architectures for image encoding and generation, according to one or more embodiments.

Referring now to FIG. 1, exemplary neural network architectures for image encoding and generation are shown, according to one or more embodiments. Turning now to exemplary neural network 100, it is illustrated that, according to some exemplary neural networks, an input image 105 is fed into an encoder sub-network 110, which may serve to interpret the image and encode various features related to the input image 105 into feature embeddings. The resulting feature embedding may take the form of a latent representation (or latent code) 115, which refers to a set of lower-dimensional numerical representations of an image that encapsulate certain abstract properties of the image, such that, in so-called "latent space," the latent representations of images with similar inherent abstract properties with respect to the task at hand are close together in latent space, even if the images' similarity is based on non-observable attributes.

Next, a decoder/generator block 120 of the network may be used to combine the determined features and upsample the image to generate an output image 125, based on the training of the network (e.g., an output image that is a modified version of the input image, based on the application of a target photographic and/or artistic style, or the like). While such deep neural networks are quite powerful and can perform highly complex tasks, one difficulty is that there is no way for a human to know what the network is "seeing" internally when it processes an image, and there is also no way to control what the network is going to generate on the output (e.g., if you wanted to make the image a little brighter, change the white balance, change a lighting characteristic(s), such as direction, intensity, color, etc., by changing a lighting vector encapsulating such lighting characteristic(s), and/or remove certain types of artifacts from the output image, etc.). Further, there is no way for humans to interpret or understand the semantic meaning of latent representation (115) that the network generates. Thus, it would be desirable to generate neural networks that provide both: 1.) performance of image decomposition tasks; and 2.) some degree of configurability, in terms of what type of image the generator will generate. For example, if the semantic meanings of the latent representations could be separated into human interpretable components, then such latent representation components could be modified in particular ways to achieve predictable desired results at inference time.

Turning now to exemplary neural network 150, it is illustrated that, according to some exemplary neural networks, an input image may be fed into an encoder sub-network 155, which, as described above, can interpret and discover the various features of the input data, e.g., an input image. According to some network embodiments, various learned representations of the input images determined by the encoder may then be separated and disentangled into multiple discrete learned representation components, e.g., learned representation A (160A), learned representation B (160B), and learned representation C (160C), as illustrated in FIG. 1, each with a separate, interpretable semantic meaning.

At inference time, each learned representation component could then be modified or augmented (e.g., via concatenation) with one or more additional matrices or vectors of values, thereby creating modified learned representation components for the input image. In some cases, the augmented values may comprise encodings of different photographic and/or artistic styles or different lightings that a user may desire to apply to the image encoding, prior to application of the decoding subnetwork 165 and generation of a stylized output image. For example, as illustrated in FIG. 1, modification of learned representation A (160A) to three different values (e.g., as illustrated by exemplary output images $170_1$, $170_2$, and $170_3$) may make the resulting output image progressively darker (or lighter) in a predictable (and user-controllable) manner. As another example, modification of learned representation B (160B) to three different values (e.g., as illustrated by exemplary output images $175_1$, $175_2$, and $175_3$) may change the lighting direction in the resulting output image (e.g., panning from left to right across the image) in a predictable (and user-controllable) manner. It is to be understood that lighting intensity and lighting direction are merely two exemplary image representations that could be learned and independently controlled in the application of a particular style to an input image. By saving and storing the modifications made to these learned representations by individual users, so-called "personalized" styles may be created and shared between users and/or used to improve global style models.

Figure 2:
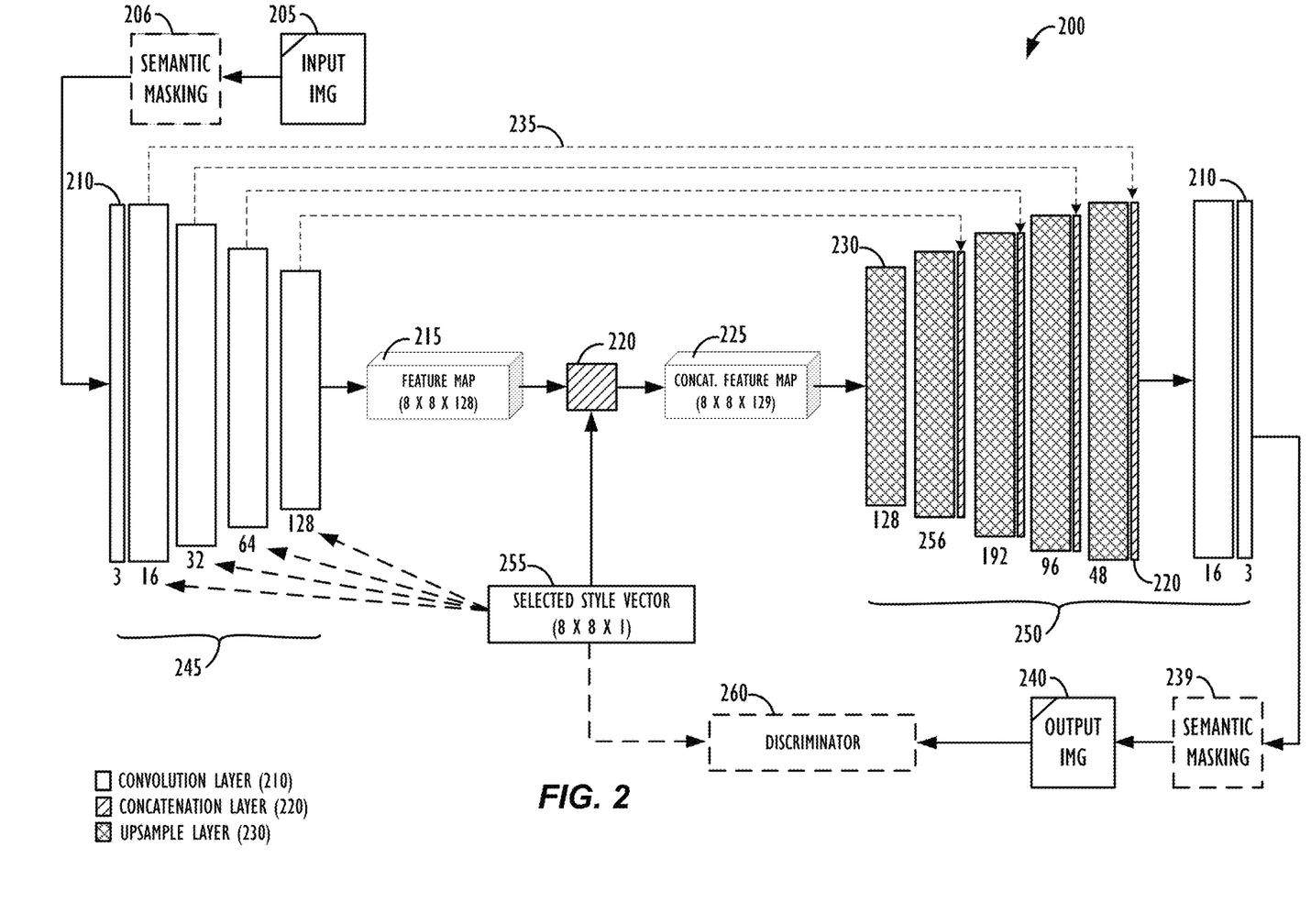
FIG. 2 illustrates an exemplary image stylization pipeline including a neural network architecture for learning multiple image styles, according to one or more embodiments.

Exemplary Image Stylization Pipeline Utilizing a Neural Network Architecture Trained to Learn Multiple Image Styles Turning now to FIG. 2, an exemplary image stylization pipeline including a neural network architecture 200 for learning multiple image styles is shown, according to one or more embodiments. The neural network architecture 200 of the image stylization pipeline may comprise: 1) an encoder network 245, which encodes an input image 205, into a feature map 215; 2) a feature embedding matrix for injecting a selected style vector 255 into the neural network; and 3) a decoder network 250, which decodes the image's selected stylistic and structural components from a concatenated feature map 225 and generates an output image 240. In some embodiments, neural network architecture 200 may further comprise a discriminator network and/or conditional GAN loss term 260 during training, which may be used to reduce artifacts and generate images that more closely match the selected style.

In neural network architecture 200, an input image 205 is first fed to the various convolutional layers 210 of the encoder network 245. In some embodiments, a semantic masking operation 206 may be applied to the input image 205 data before it is fed into the neural network architecture 200. Semantic masking operation 206 may have the effect of identifying and/or limiting the portions of the input image 205 that are of interest in the stylization operation. For example, in some embodiments, a user may desire to apply the network stylization to only the sky regions of the input image, only water regions of the input image, only regions of the input image where faces appear, etc. Pixels of the input image 205 that are determined not to be part of the semantic regions of the input image for which network stylization is desired may have their values set to zero in a semantic mask or otherwise be removed from the input image data before further processing by the neural network architecture 200, such that, the stylized pixels may be recombined with the excluded (i.e., unstylized) pixels to form the output image 240, which will have the network stylization applied to only the semantic regions of interest within the input image 205.

Alternatively, or additionally, to semantic masking operation 206, a semantic masking operation 239 may be performed and applied to the output image data from neural network architecture 200. In such embodiments, the network's stylization may be applied to the entire input image 205, and then, at the time of rendering the final stylized output image 240, the determined semantic mask may be overlaid on the original input image data, e.g., using a blend-with-mask filter, such that the stylized pixels determined by the neural network architecture 200 are only used in the output image 240 within the regions defined by the semantic masking operation 239 and the original input image pixels are used in all other regions.

The encoder network 245 may comprise a cascade of convolution blocks 210, followed by one or more normalization operations. The numbers below the various convolutional layers (e.g., 3, 16, 32, 64, 128, etc.) represent hypothetical channel depths for the respective layers, and the relative heights of the layers reflect the relative sizes of the image representation at the respective layers. For example, in some embodiments, each successive layer may reduce the resolution of the image by half (in the case of successive downsampling layers) or double the resolution of the image (in the case of successive upsampling layers).

The image features coming out of the encoder, e.g., in the form of feature map 215, may comprise particular dimensions, e.g., 8×8×128, as illustrated in FIG. 2. As mentioned above, according to some embodiments, one or more styles may be selected, e.g., in the form of a lookup entry (such as a 1-D style vector) in an embedding matrix, which may then be reshaped as needed in the form of a selected style vector 255 that may be concatenated (layer 220) with the feature map 215, i.e., as an additional feature channel, to generate concatenated feature map 225. In the example shown in FIG. 2, the selected style vector may comprise a 1-D style vector with n-parameters, where n may, e.g., have a value of 64. In order to be injected into the neural network 200 at the desired location of concatenation layer 220, it may first need to be reshaped into two-dimensions (e.g., an 8×8 array of parameters, with a single channel of information at each position, thus resulting in the illustrated 8×8×1 selected style vector 255). Then, the selected style-specific vector 255 may be concatenated with feature map 215, resulting in concatenated feature map 225 (e.g., 8×8 array of parameters, with 129 channels of information at each position, i.e., the existing 128 channels from feature map 215 concatenated with the single channel of the selected style vectors 255, thus resulting in the illustrated 8×8×129 concatenated feature map 225). Although the example described above contemplates injecting the selected style vector 255 at a single, first desired location within the network (i.e., at the end of the downsampling layers), the selected style vector 255 may also be injected at other locations (or multiple locations), as is desired by a given implementation. For example, as shown in FIG. 2, the selected style vector 255 may alternately be included after each downsampling layer. As may now be understood, some parts of the network are shared across styles, while other parts are learned on a per-style basis.

These features of concatenated feature map 225 are then passed on to decoder network 250 that determines the output image's style and structural components, as stylized according to the selected style vector 255, and generates an output image 240. The decoder network 250 may comprise various upsampling 230 and concatenation 220 layers (i.e., to concatenate the deconvolutional layers with the downsampled feature vectors of their corresponding downsampling layer with skip connections 235), before the application of final convolution layers 210, to bring the output image 240 back into a displayable (and human-understandable) format, e.g., comprising values for each pixel in each of 3 color channels, such as red, green, and blue. As mentioned above, the numbers below the various upsampling layers (e.g., 128, 256, 192, 96, 48, 16, 3, etc.) represent hypothetical channel depths for the respective layers, and the relative heights of the layers reflect the relative sizes of the image representation at the respective layers.

In some embodiments, it may also be desirable to control the strength of the application of a given style. For example, in some such embodiments, an upsampling algorithm may be employed that upsamples a low resolution stylized image that is output from the neural network architecture 200 to the dimensions of a full resolution output image. During this upsampling operation, a grid of transformations (e.g., affine color transformation) may be estimated between the low resolution original input image and the low resolution stylized version of the input image. In order to manipulate and control the strength of the application of a given style, a grid (e.g., a 32×32 grid) defining a set number of locally affine color transforms between the low resolution original input image and the low resolution stylized version of the input image may be used to generate various strengths of stylized full resolution versions of the input image. It is to be understood that such network parameters, upsampling, and downsampling factors are merely exemplary and may be modified, as needed, for a given implementation. In some embodiments, a user may also be able to specify a desired strength for the application of a given style and/or the application of the given style to only certain semantic region(s) of an image on either a per-image, per-group of images, or global basis, i.e., across the user's entire image library.

It is also to be understood that further upsampling may be performed on the stylized image 240 output by the network, e.g., if the original and/or native resolution of images on the device performing the stylization is different than that of the network's output resolution. In other cases, the stylized image may also be blended with one or more other images, e.g., an unstylized version of the image and/or a differently-styled version of the image, in order to control the strength of application of the particular selected style.

According to some embodiments, the neural network architecture for may also include a discriminator network and/or conditional generative adversarial network (C-GAN) 260 during training, to attempt to make the re-rendered images look more natural and further reduce the artifacts. For this purpose, a discriminator network may optionally be used to score real and "fake" training images, including the output image 240, e.g., with higher scores corresponding to images that more correctly portray the selected style and lower scores corresponding to images that the discriminator is able to determine are not "real" images having the selected style. (As illustrated in FIG. 2, the selected style vector 255 may also be input into the discriminator network 260 so that it is conditioned on both the real image and the selected style vector. Without such conditioning, the C-GAN would be disadvantaged in determining whether the image correctly portrayed the selected style.) In some cases, the discriminatory may be specifically modified to handle the use of paired training images (i.e., wherein each training image pair comprises a stylized and an unstylized version of the training image). In other cases, a pool memory of historically-generated image examples may be randomly sampled from when training the GAN.

Figure 3:
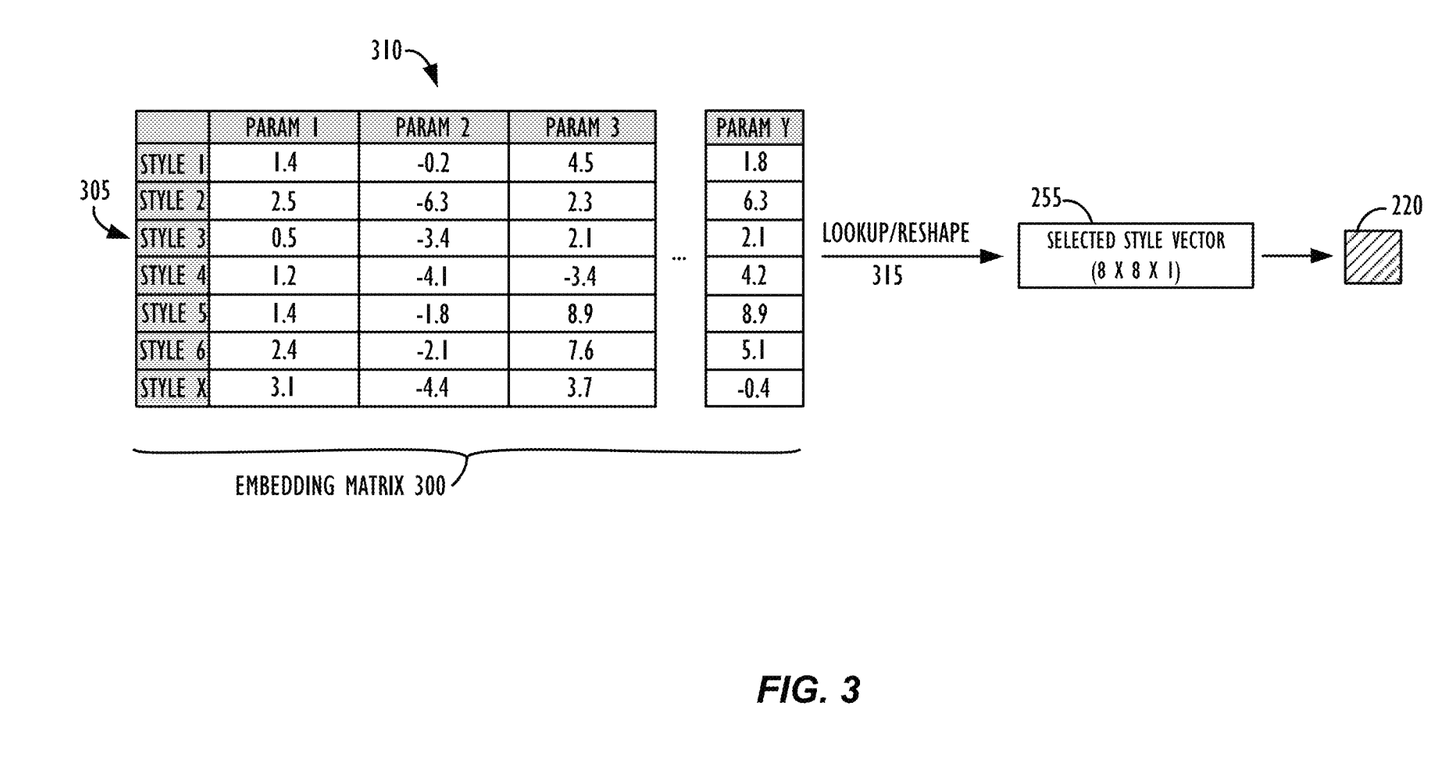
FIG. 3 illustrates an exemplary embedding matrix for a neural network architecture for learning multiple image styles, according to one or more embodiments.

Turning now to FIG. 3, an exemplary embedding matrix 300 for a neural network architecture for learning multiple image styles is shown, according to one or more embodiments. The exemplary embedding matrix 300 is shown as having up to X style entries, with one style embodied in each of the rows 305 of the matrix 300. Each style may, in turn, be represented as a 1-D vector comprised of up to Y parameters, with one parameter shown in each of the columns 310 of the matrix 300. As mentioned above, each of the parameters making up the entry for a given style may have been learned during the training phase of the network, e.g., using "ground truth" images that have been stylized into the desired style (e.g., by a professional photographer or graphic artist). Each style may comprise various corrective image enhancements (e.g., brightening shadows) and/or local image modifications (e.g., radial filters, elliptical filters, enhancing the appearance of faces within the image), global image-level modifications (e.g., white balance), or a combination of local image modifications and global image-level modifications, such as enhancements that may be made in the RAW image format by a photographer or graphic artist using professional-grade image editing software).

According to other embodiments, additional styles may be learned in an ad hoc fashion, e.g., on relatively smaller sets of images, e.g., fewer than 100 images, which the network may be trained on 'in the wild,' i.e., during run time use of the device by a user. Such ad hoc learned styles may also be stored as their own entry row in embedding matrix 300. Once a particular style has been selected by a user, at Step 315, the selected style entry may be looked up from the embedding matrix 300 and reshaped (if necessary) into the aforementioned selected style vector 225 (e.g., a 64-entry 1-D vector that is reshaped into a vector having 8×8×1 dimensions, in this case) for injection into the neural network at a first location, e.g., via concatenation layer 220, as shown and described above with reference to FIG. 2.

Figure 4A:
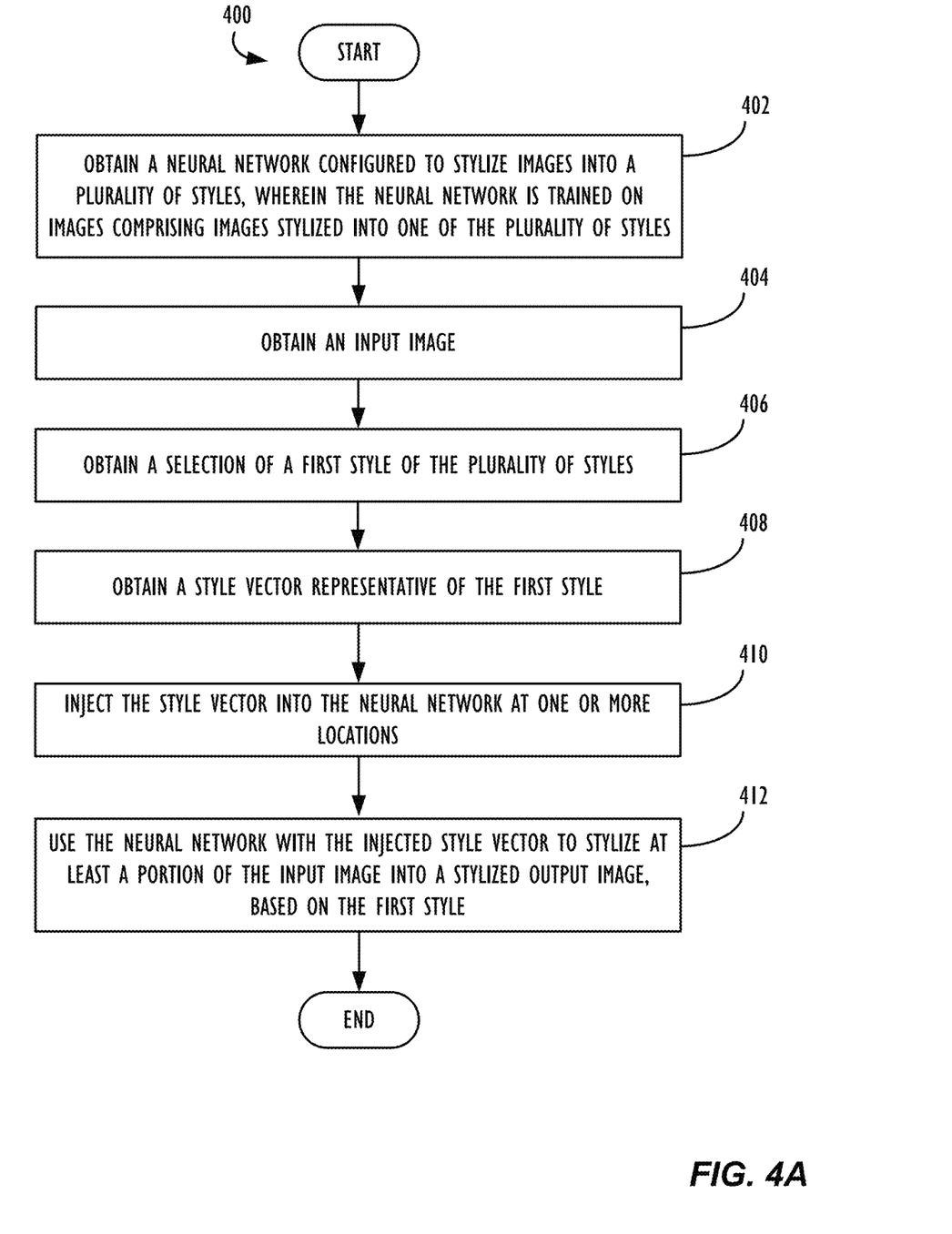
FIG. 4A is a flow chart illustrating a method of image stylization using a neural network, according to various embodiments.

Exemplary Methods for Using and Training Neural Networks to Learn Multiple Image Styles Turning now to FIG. 4A, a flow chart illustrating a method 400 of image stylization using a neural network is shown, according to various embodiments. First, at Step 402, the method 400 may obtain a neural network configured to stylize images into a plurality of styles, wherein the neural network is trained on images comprising images stylized into one of the plurality of styles. Next, at Step 404, the method 400 may obtain an input image, e.g., an image that a user desires to stylize in a particular style. Next, at Step 406, the method 400 may obtain a selection of a first style of the plurality of styles, e.g., as received via a user interface of an electronic device. Next, at Step 408, the method 400 may obtain a style vector representative of the first style. For example, as described above, the selected style may be represented by a row index number into an embedded matrix, which row index may be used to lookup an appropriate style vector from an embedded matrix, such as matrix 300, illustrated above in FIG. 3. Next, at Step 410, the method 400 may reshape (if necessary) the obtained style vector representative of the selected first style and inject the style vector into the neural network at a first location. For example, the first location may comprise one of: a bottleneck layer of the neural network; a downsampling layer of the neural network; or an upsampling layer of the neural network. Finally, at Step 412, the method 400 may use the neural network with the injected style vector to stylize at least a portion of the input image into a stylized output image, i.e., based on the selected first style. As mentioned above, if one or more semantic masking regions are being used in a given implementation, then the stylized output image created at Step 412 may comprise a version of the input image that is stylized with the output of the neural network only in those portions of the input image that are a part of the determined semantic masking region(s).

Figure 4B:
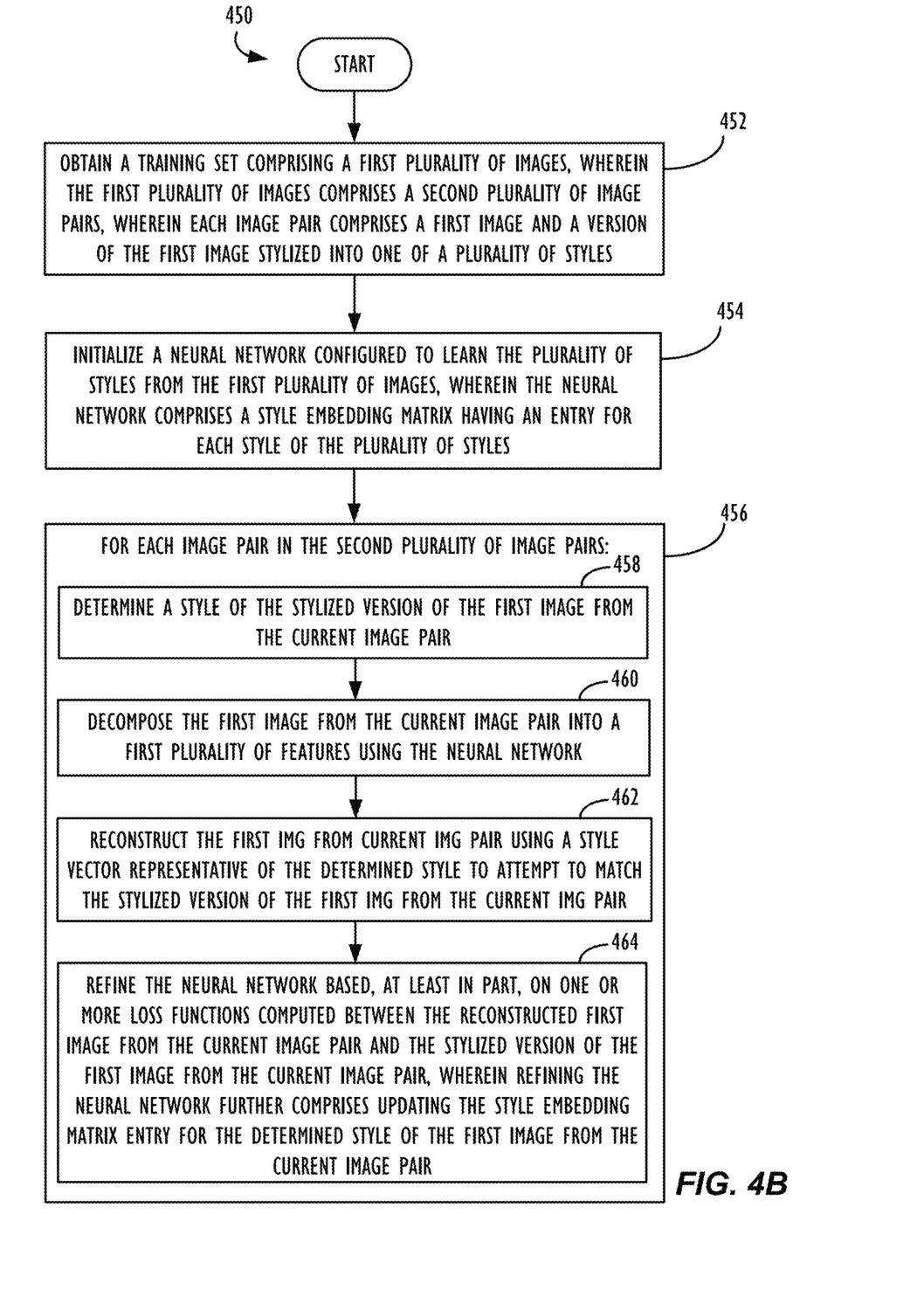
FIG. 4B is a flow chart illustrating a method of training a neural network for multi-style image stylization, according to various embodiments.

Turning now to FIG. 4B, a flow chart illustrating a method 450 of training a neural network for multi-style image stylization is shown, according to various embodiments. First, at Step 452, the method 450 may obtain a training set comprising a first plurality of images, wherein the first plurality of images comprises a second plurality of image pairs, wherein each image pair comprises a first image and a version of the first image stylized into one of a plurality of styles. In some cases, each image pair may also comprise versions of the first image stylized into each of two or more styles of the plurality of styles. In still other cases, a given image pair may not necessarily include the original or unstylized version of the first image, and instead only comprise one or more stylized versions of a first image and one or more unrelated images, e.g., unrelated images possessing some image characteristic (e.g., a particular dynamic range) that it is desired for the network to learn. Next, at Step 454, the method 450 may initialize a neural network that is to be configured to learn the plurality of styles from the first plurality of images, wherein the neural network comprises a style embedding matrix having an entry for each style of the plurality of styles. Next, at Step 456, the method 450 may begin to train itself over each of the various images in the training set (which may, e.g., be comprised of a second plurality of image pairs).

For example, for each image pair in the second plurality of images pairs, beginning at Step 458, the method 450 may determine a style of the stylized version of the first image from the current image pair. This step is performed so that the network knows which particular style it is training on for a given image (and, thus, what entry in the embedding matrix it is updating). Next, at Step 460, the method 450 may decompose the first image from the current image pair into a first plurality of features using the neural network. At Step 462, the method 450 may reconstruct the first image from the current image pair to attempt to match the stylized version of the first image from the current image pair.

Finally, at Step 464, the neural network model may be refined based, at least in part, on one or more loss functions (e.g., L1, L2, multi-scale structural similarity index (MS-SSIM), feature losses, cycle consistency loss, etc.) computed between the reconstructed first image from the current image pair and the stylized version of the first image from the current image pair, which loss functions may be tuned and/or differentially-weighted, as desired, for a given implementation. For example, refining the neural network further may comprise updating the style embedding matrix entry for the determined style of the first image from the current image pair. According to some embodiments, at least one of the one or more loss functions computed between each reconstructed first image and the stylized version of each first image may further comprise an adversarial loss term for the reconstructed first image.

According to other embodiments, the method 450 may further comprise, for each image pair in the second plurality of image pairs: performing an instance normalization operation (e.g., a conditional instance normalization (CIN) operation) on the first image from the current image pair. According to such embodiments, performing CIN may allow the method to normalize the network weights, e.g., on a per-style basis, and preserve what it has been trained on in the past, while it is learning a new style—even if the new style is very different from the styles the network has already been trained on.

According to still other embodiments, the method 450 may further comprise: obtaining a third plurality of images, wherein the third plurality of images comprise images stylized in an ad hoc style that is not among the plurality of styles the network has been pre-trained on; and, for each image in the third plurality of images: performing a conditional instance normalization (CIN) operation on the current image from the third plurality of images; and refining the neural network based, at least in part, on one or more parameters learned from the current image of the third plurality of images to learn the ad hoc style.

In some cases, a federated learning approach may be employed, wherein at least a portion of the parameters learned relating to the ad hoc style is transmitted via a network to a server for aggregation and improvement of global style models. In this way, photographic and/or artistic styles learned by individual users' devices may easily be shared with other users, e.g., directly or via an online repository of learned user styles. As may be understood, appropriate anonymization and/or privacy-preserving techniques may be applied to any user data before being contributed to an online repository, such that no confidential or personally identifiable information is transmitted to a third party without a user's consent.

According to still other such embodiments, each image pair may further comprise a version of the first image stylized into each of the plurality of styles, and, for each image pair in the second plurality of image pairs, the method may further comprise: determining a style of each of the stylized versions of the first image from the current image pair; decomposing the first image from the current image pair into a first plurality of features using the neural network; reconstructing the first image from the current image pair a plurality of times, using a style vector representative of the corresponding determined style each time, to attempt to match each of the stylized versions of the first image from the current image pair; and refining the neural network based, at least in part, on one or more loss functions computed between each of the reconstructed versions of the first image from the current image pair and the corresponding stylized version of the first image from the current image pair. In some embodiments, refining the neural network may further comprise updating the corresponding style embedding matrix entry for the style of the respective stylized version of the first image from the current image pair.

Exemplary Electronic Computing Devices

Figure 5:
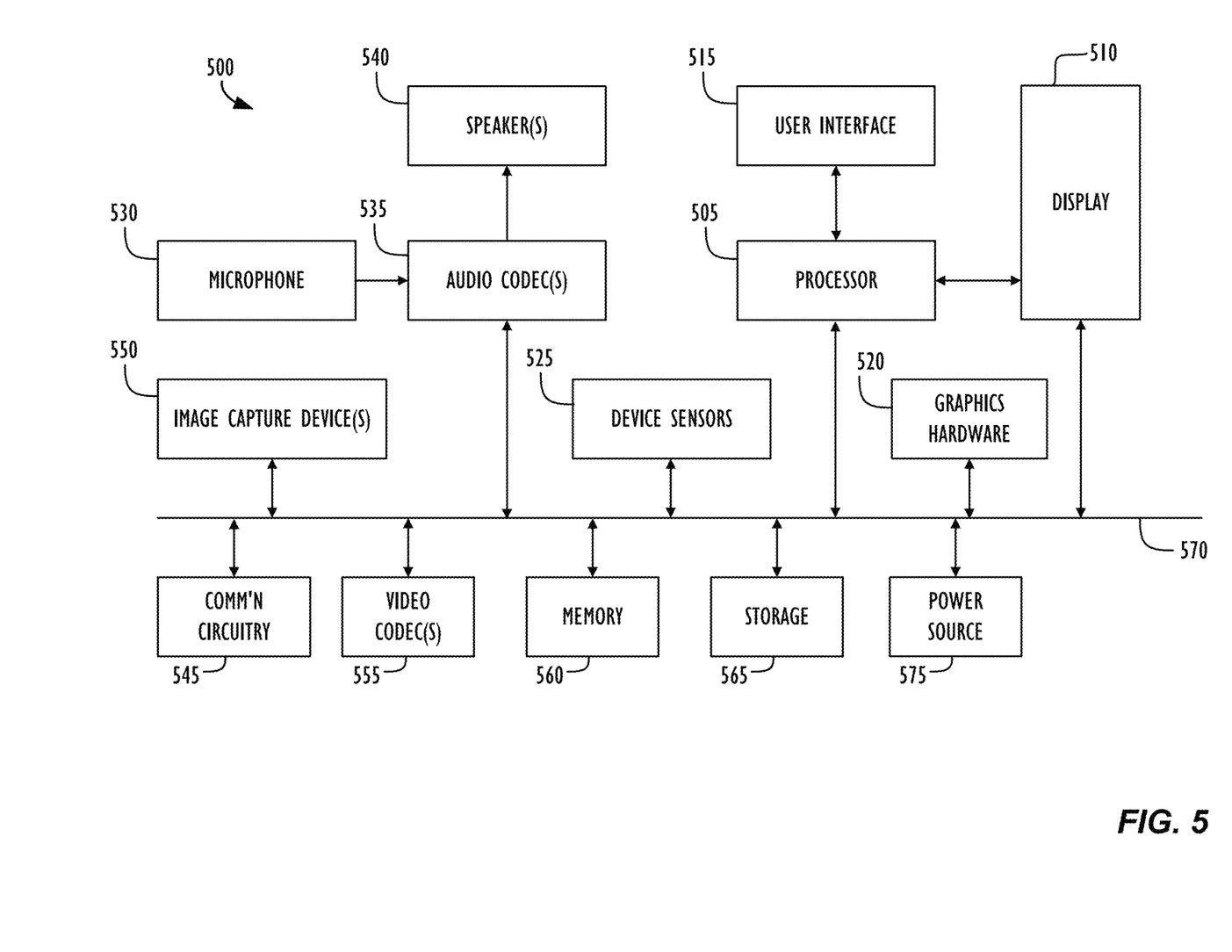
FIG. 5 is a block diagram illustrating a programmable electronic computing device, in which one or more of the techniques disclosed herein may be implemented.

Referring now to FIG. 5, a simplified functional block diagram of illustrative programmable electronic computing device 500 is shown according to one embodiment. Electronic device 500 could be, for example, a mobile telephone, personal media device, portable camera, or a tablet, notebook or desktop computer system. As shown, electronic device 500 may include processor 505, display 510, user interface 515, graphics hardware 520, device sensors 525 (e.g., proximity sensor/ambient light sensor, accelerometer, inertial measurement unit, and/or gyroscope), microphone 530, audio codec(s) 535, speaker(s) 540, communications circuitry 545, image capture device 550, which may, e.g., comprise multiple camera units/optical image sensors having different characteristics or abilities (e.g., Still Image Stabilization (SIS), HDR, OIS systems, optical zoom, digital zoom, etc.), video codec(s) 555, memory 560, storage 565, and communications bus 570.

Processor 505 may execute instructions necessary to carry out or control the operation of many functions performed by electronic device 500 (e.g., such as the generation and/or processing of images in accordance with the various embodiments described herein). Processor 505 may, for instance, drive display 510 and receive user input from user interface 515. User interface 515 can take a variety of forms, such as a button, keypad, dial, a click wheel, keyboard, display screen and/or a touch screen. User interface 515 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 510 may display a video stream as it is captured while processor 505 and/or graphics hardware 520 and/or image capture circuitry contemporaneously generate and store the video stream in memory 560 and/or storage 565. Processor 505 may be a system-on-chip (SOC) such as those found in mobile devices and include one or more dedicated graphics processing units (GPUs). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 perform computational tasks. In one embodiment, graphics hardware 520 may include one or more programmable graphics processing units (GPUs) and/ or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device 550 may comprise one or more camera units configured to capture images, e.g., images which may be stylized into one or more versions of said captured images, e.g., in accordance with this disclosure. Output from image capture device 550 may be processed, at least in part, by video codec(s) 555 and/or processor 505 and/or graphics hardware 520, and/or a dedicated image processing unit or image signal processor incorporated within image capture device 550. Images so captured may be stored in memory 560 and/or storage 565. Memory 560 may include one or more different types of media used by processor 505, graphics hardware 520, and image capture device 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums or NPSDs including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505, such computer program code may implement one or more of the methods or processes described herein. Power source 575 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 500.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory program storage device (NPSD) comprising computer readable instructions executable by one or more processors to:
    obtain a neural network configured to stylize images into a plurality of styles, wherein the neural network is trained on images comprising images stylized into one of the plurality of styles;
    obtain an input image;
    obtain a selection of a first style of the plurality of styles;
    obtain a style vector representative of the first style;
    inject the style vector into the neural network at a first location; and
    use the neural network with the injected style vector to stylize at least a portion of the input image into a stylized output image, based on the first style.

2. The NPSD of claim 1, comprising further computer readable instructions executable by one or more processors to: inject the style vector into the neural network at one or more second locations.

3. The NPSD of claim 1, comprising further computer readable instructions executable by the one or more processors to: identify one or more semantic regions within the input image, wherein the computer readable instructions to stylize at least a portion of the input image into a stylized output image based on the first style further comprise computer readable instructions to stylize only the identified one or more semantic regions within the input image.

4. The NPSD of claim 1, wherein the style vector representative of the first style is obtained from an embedding matrix.

5. The NPSD of claim 1, wherein the first location comprises one of: a bottleneck layer of the neural network; a downsampling layer of the neural network; or an upsampling layer of the neural network.

6. The NPSD of claim 1, wherein the style vector is injected into the neural network in the form of an additional feature channel.

7. The NPSD of claim 6, wherein the additional feature channel is concatenated with an existing feature map at the first location in the neural network.

8. A system, comprising:
    one or more processors; and
    one or more non-transitory program storage devices comprising computer readable instructions executable by the one or more processors to:
        obtain a neural network configured to stylize images into a plurality of styles, wherein the neural network is trained on images comprising images stylized into one of the plurality of styles;
        obtain an input image;
        obtain a selection of a first style of the plurality of styles;
        obtain a style vector representative of the first style;
        inject the style vector into the neural network at a first location; and
        use the neural network with the injected style vector to stylize at least a portion of the input image into a stylized output image, based on the first style.

9. The system of claim 8, wherein the computer readable instructions further comprise computer readable instructions executable by one or more processors to: inject the style vector into the neural network at one or more second locations.

10. The system of claim 8, comprising further computer readable instructions executable by the one or more processors to: identify one or more semantic regions within the input image, wherein the computer readable instructions to stylize at least a portion of the input image into a stylized output image based on the first style further comprise computer readable instructions to stylize only the identified one or more semantic regions within the input image.

11. The system of claim 8, wherein the style vector representative of the first style is obtained from an embedding matrix.

12. The system of claim 8, wherein the first location comprises one of: a bottleneck layer of the neural network; a downsampling layer of the neural network; or an upsampling layer of the neural network.

13. The system of claim 12, wherein the style vector is injected into the neural network in the form of an additional feature channel.

14. A method, comprising:
obtaining a training set comprising a first plurality of images, wherein the first plurality of images comprises a second plurality of image pairs, wherein each image pair comprises a first image and a version of the first image stylized into one of a plurality of styles;
initializing a neural network configured to learn the plurality of styles from the first plurality of images, wherein the neural network comprises a style embedding matrix having an entry for each style of the plurality of styles; and
for each image pair in the second plurality of image pairs:
determining a style of the stylized version of the first image from the current image pair;
decomposing the first image from the current image pair into a first plurality of features using the neural network;
reconstructing the first image from the current image pair using a style vector representative of the determined style to attempt to match the stylized version of the first image from the current image pair; and
refining the neural network based, at least in part, on one or more loss functions computed between the reconstructed first image from the current image pair and the stylized version of the first image from the current image pair, wherein refining the neural network further comprises updating the style embedding matrix entry for the determined style of the first image from the current image pair.

15. The method of claim 14, wherein at least one of the one or more loss functions computed between each reconstructed first image and the stylized version of each first image comprises an adversarial loss term for the reconstructed first image.

16. The method of claim 14, further comprising:
for each image pair in the second plurality of image pairs:
performing an instance normalization operation on the first image from the current image pair.

17. The method of claim 16, wherein the instance normalization operation comprises a conditional instance normalization (CIN) operation based, at least in part, on the determined style of the stylized version of the first image from the current image pair.

18. The method of claim 14, further comprising:
obtaining a third plurality of images, wherein the third plurality of images comprise images stylized in an ad hoc style that is not among the plurality of styles; and
for each image in the third plurality of images:
performing a conditional instance normalization (CIN) operation on the current image from the third plurality of images; and
refining the neural network based, at least in part, on one or more parameters learned from the current image of the third plurality of images to learn the ad hoc style.

19. The method of claim 18, wherein at least a portion of the parameters learned relating to the ad hoc style is transmitted via a network to a server for aggregation into a global style model.

20. The method of claim 14, wherein each image pair further comprises a version of the first image stylized into each of the plurality of styles, and wherein:
for each image pair in the second plurality of image pairs, the method further comprises:
determining a style of each of the stylized versions of the first image from the current image pair;
decomposing the first image from the current image pair into a first plurality of features using the neural network;
reconstructing the first image from the current image pair a plurality of times, using a style vector representative of the corresponding determined style each time, to attempt to match each of the stylized versions of the first image from the current image pair; and
refining the neural network based, at least in part, on one or more loss functions computed between each of the reconstructed versions of the first image from the current image pair and the corresponding stylized version of the first image from the current image pair, wherein refining the neural network further comprises updating the corresponding style embedding matrix entry for the style of the respective stylized version of the first image from the current image pair.

* * * * *